Feb. 12, 1963 H. GÖPFERT 3,077,153
PHOTOGRAPHIC OR CINEMATOGRAPHIC CAMERA
Filed March 7, 1960
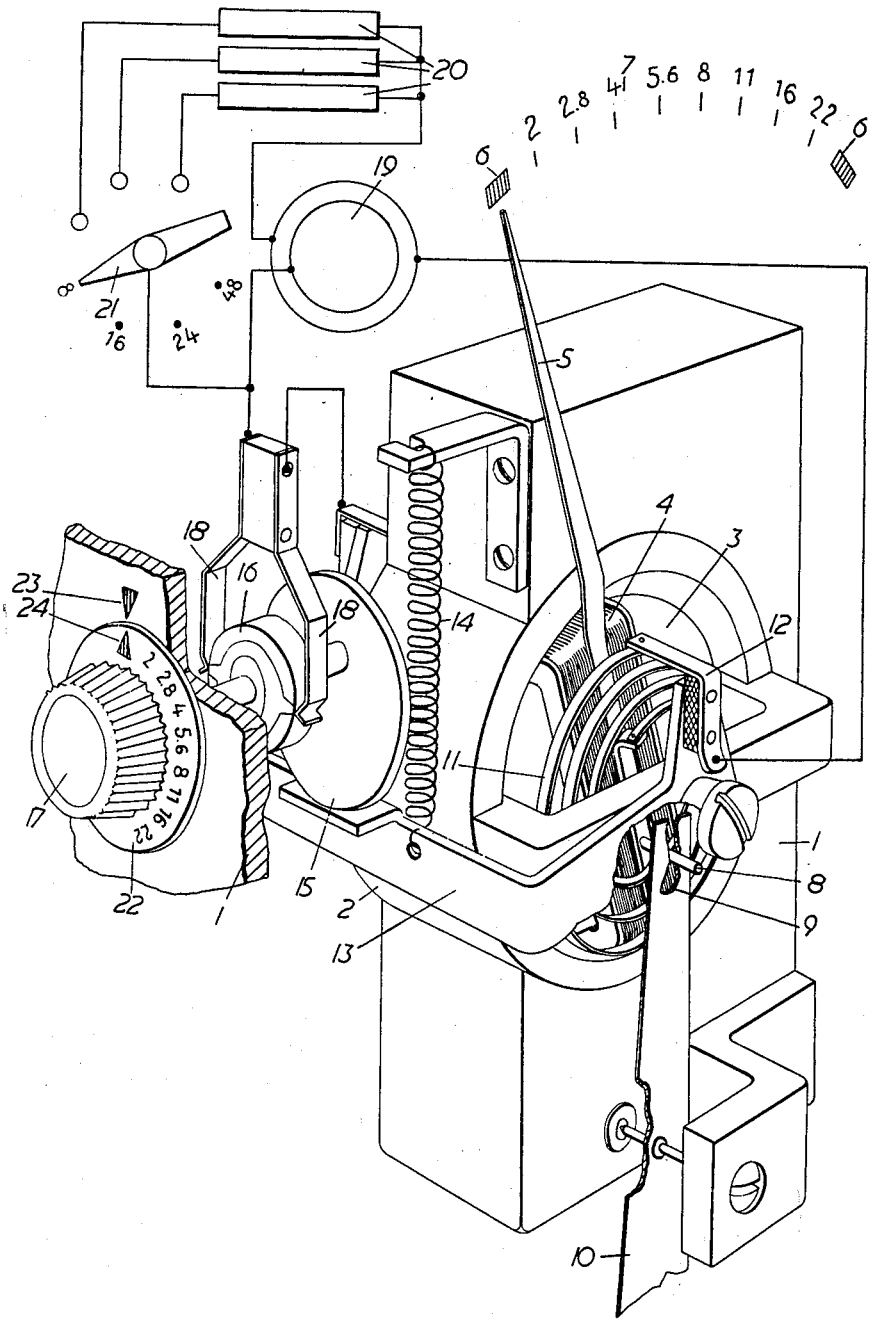
Inventor
HERBERT GÖPFERT
By *Irwin S. Thompson*
Attorney United States Patent Office 3,077,153
Patented Feb. 12, 1963

3,077,153
PHOTOGRAPHIC OR CINEMATOGRAPHIC
CAMERA
Herbert Göpfert, Dresden, Germany, assignor to VEB
Kamera- und Kinowerke Dresden, Dresden, Germany
Filed Mar. 7, 1960, Ser. No. 13,314
4 Claims. (Cl. 95—64)

The present invention relates to a photographic or cinematographic camera with a disengageable automatic control device for exposure factors, wherein for the automatically controllable exposure factor, for example the lens diaphragm aperture, there is provided a setting handle on actuation of which a switch disposed in the control current circuit is opened or closed.

Such a control device has already been proposed wherein the setting handle is coupled through rigid intermediate members with the moving coil which controls the diaphragm mechanism. In view of the sensitivity of the moving coil mounting, in the case of inexpert rotation of the setting handle, there is a danger of damage to the sensitive mounting of the moving coil.

An object of this invention is to remove this danger.

In accordance with the invention this is achieved due to the fact that between the setting handle and the moving coil there is arranged an elastic transmission member, for which there is preferably used the usual return spring of the moving coil itself, so that separate elastic transmission members are avoided.

The details of the invention may be seen from an example of embodiment as described and represented.

In the housing 1 there is arranged the measuring mechanism 2, about the core magnet 3 of which the moving coil 4 swings. With the moving coil 4 there is connected the pointer 5, which swings in relation to a diaphragm scale 7 visible in the view finder and provided with defining marks 6, and carries a pin 8 which engages in the curve 9 of the rotatably mounted arm 10 of a diaphragm mechanism (not shown in greater detail).

The return spring 11 of the measuring mechanism 2 is secured with one end on the moving coil 4 and with the other end in insulated fashion to the lug 12 of the pivoting lever 13, which is rotatably mounted about the measuring mechanism spindle. The pivoting lever 13 is drawn by the spring 14 against the cam disc 15, which is arranged with the contact bridge 16 firmly on the spindle of the setting handle 17. Two sliding contacts 18 are connected in series with the moving coil 4 electrically connected with the photo-electric cell 19. In parallel with the photo-electric cell 19 there are connected a plurality of resistances 20, which can be connected according to choice through a switch 21, in order to be able to take into consideration various further exposure factors, such for example as picture frequency, film sensitivity and filter factors. On the setting handle 17 there are situated the diaphragm scale 22 and the index 23, which stands opposite the index 24 fast with the housing, when the automatic system is engaged.

The manner of operation of the device is as follows:

If it is desired to abstain from the automatic exposure control and to set the diaphragm by hand, the setting handle 17 is rotated to any desired diaphragm value of the scale 22. Then at the same time the contact bridge 16 also rotates and opens the current circuit of the photo-electric cell, so that the pointer 5 of the moving coil 4 sets itself to the value of the diaphragm scale 7 visible in the viewfinder of the camera and corresponding to the position of the setting handle. This occurs because, on rotation of the setting handle 17, the pivoting lever 13 is also rotated, through the cam disc 15. This pivoting lever 13 is connected through the insulated lug 12 with one end of the return spring 11. Since the return spring 11 seeks to expand or to remain in the expanded position, the other end of the return spring 11, connected with the moving coil, follows the movements of the end of the return spring 11 connected with the lug 13. In this movement rapid rotations of the setting handle 17 are taken up by the return spring and transmitted elastically to the moving coil, so that no mechanical stressing of the delicate point suspension of the moving coil takes place.

I claim:

1. In a photographic camera including a housing, a shutter device having an adjustable aperture diaphragm, a photo-electric cell, a moving coil electrically connected to said photo-electric cell and mounted in said housing, and a return spring arranged within the housing having one end connected to said moving coil, said moving coil being operatively connected to said aperture diaphragm for automatically controlling the setting of the latter, the provision of a manually settable aperture diaphragm control member mounted on the housing, a lever pivotally mounted within the housing and adjustably movable by said control member and connected to that end of the return spring which is remote from the end connected to the moving coil, and switching means operable by said control member for making the electrical connection between the photo-electric cell and the moving coil for automatic control of the aperture diaphragm and breaking said electrical connection during manual setting of the aperture diaphragm by said control member through the lever and return spring.

2. A camera according to claim 1 wherein the pivoted lever is mounted for rotation about the spindle of the moving coil, and comprising a cam disk which operatively couples said pivoted lever with the control member.

3. A camera according to claim 1, wherein the switching means comprises a contact bridge which is firmly connected to said control member for rotation thereby.

4. A camera according to claim 1, including a spindle carried in the housing and having said control member rigidly connected thereto, a cam disk also rigidly connected to said spindle and engaged by said lever, and a spring connected between the housing and said lever for maintaining the engagement of said lever and cam disk.

References Cited in the file of this patent
UNITED STATES PATENTS

| | | |
|---|---|---|
| 2,061,909 | Karg | Nov. 24, 1936 |
| 2,186,613 | Mihalyi | Jan. 9, 1940 |
| 2,841,064 | Bagby et al. | July 1, 1958 |
| 2,920,542 | Engelsmann | Jan. 12, 1960 |
| 2,923,170 | Pfaffenberger | Feb. 2, 1960 |

FOREIGN PATENTS

| | | |
|---|---|---|
| 827,027 | France | Jan. 18, 1938 |